US006756773B2

United States Patent
Koretsky et al.

(10) Patent No.: US 6,756,773 B2
(45) Date of Patent: Jun. 29, 2004

(54) SWITCHING MODE POWER SUPPLY WITH FORWARD-LOOKING REGULATION FOR A PULSED LOAD

(75) Inventors: Victor Koretsky, Ramana (IL); Nir Michael, Tel Aviv (IL)

(73) Assignee: D.S.P. Group Ltd., Herzelia Pituach (IL)

( * ) Notice: Subject to any disclaimer, the term of this patent is extended or adjusted under 35 U.S.C. 154(b) by 0 days.

(21) Appl. No.: 10/271,667

(22) Filed: Oct. 15, 2002

(65) Prior Publication Data

US 2004/0070379 A1 Apr. 15, 2004

(51) Int. Cl.[7] ............................. H02J 3/12; G05F 1/40
(52) U.S. Cl. ................... 323/234; 323/282; 455/572
(58) Field of Search ...................... 323/234, 282, 323/284, 285, 283, 279, 273, 272; 455/572, 573, 574, 557; 363/15, 17, 20, 21.02, 40, 41, 95, 98

(56) References Cited

U.S. PATENT DOCUMENTS

| 4,180,852 A | * | 12/1979 | Koizumi et al. ............ 363/49 |
| 5,998,977 A | | 12/1999 | Hsu et al. |
| 6,049,471 A | * | 4/2000 | Korcharz et al. ............ 363/20 |
| 6,049,724 A | * | 4/2000 | Rozenblit et al. ........... 455/572 |
| 6,531,853 B2 | * | 3/2003 | Umemoto .................... 323/282 |
| 2002/0072399 A1 | | 6/2002 | Fritz |

* cited by examiner

*Primary Examiner*—Rajnikant B. Patel
(74) *Attorney, Agent, or Firm*—Nath & Associates PLLC; Marvin C. Berkowitz

(57) ABSTRACT

Apparatus and method for regulating a switching circuit of a voltage converter for supplying power to a pulsed load having a known upcoming magnitude. The voltage converter includes a switching circuit receiving a switching signal with duty cycle that is adjusted by a voltage controller. The voltage controller is responsive to a known upcoming cycle phase and a corresponding magnitude of the pulsed load for forward-correcting the duty cycle of the switching signal. In order to compensate for variations in load consumption owing, for example, to varying ambient conditions, circuit aging, battery discharge and other slow changes, or for imprecise foreknowledge thereof, the voltage controller may also monitor an output voltage of the voltage converter during successive cycles and apply feedback correction based on a predicted value of compensation required for the respective phase of a subsequent cycle.

13 Claims, 4 Drawing Sheets

SWITCHING MODE POWER SUPPLY WITH FORWARD-LOOKING REGULATION FOR A PULSED LOAD

FIELD OF THE INVENTION

This invention relates to switching mode power supplies for a pulsed load, in particular for a TDD, TDMA, Cellular, Cordless Telephony, and Telematics systems.

BACKGROUND OF THE INVENTION

Contemporary communication systems use one communication channel for more than one user at a time (time, code or frequency domain multiplexing), and for more than one direction of communication at a time (time or frequency domain duplexing). This causes the mobile unit of the communication system to consume different currents during different time phases of the communication cycle, typically Idle, Tune, Receive and Transmit.

As a result, battery consumption is bursty, there being prolonged periods of minimal battery consumption followed by bursts of high current drain.

In order to guarantee communication stability of the communication link during the burst, it is desirable to smooth power supply voltage such that frequency and timing of signals are not changed significantly on the both sides of the communication link due to voltage change caused, in turn, by current consumption change. It has been proposed in the art to smooth transmitter drain during bursts of signal transmission. For example, US20020072399 (Fritz) published Jun. 13, 2002 and entitled "Voltage controller for a pulsed load, in particular for a mobile-telephone or telematics transmitter" discloses a voltage controller for a pulsed load, in particular for a mobile telephone or telematics transmitter. In order to maintain constant power of the load, in particular the transmission power, a control element is connected between an input connection of the voltage controller and an output connection for supplying an output voltage to a pulsed load. A comparator compares an actual value signal corresponding to the output voltage with a desired reference value signal and supplies a control signal to the control element in order to adapt the actual value signal to the desired value signal. A desired value circuit derives the desired reference value signal from the input voltage in such a way that it is substantially constant over the duration of a load pulse. This is typical of feedback circuits that compare the actual voltage to a desired reference voltage and then apply error correction to adjust the output voltage.

It is also well known in the literature to use switched mode power supplies (SPMS) also known as voltage converters such as boost and buck converter circuits for step-up and step-down voltage conversion, respectively. U.S. Pat. No. 5,998,977 (Hsu et al.) published Dec. 7, 1999 and entitled "Switching power supplies with linear precharge, pseudo-buck and pseudo-boost modes" discloses a variety of startup modes for operating a boost type switching power supply. A linear charging mode couples the input voltage directly to the output voltage, thereby pre-charging the output capacitor of the switching power supply. The linear mode serves to reduce inrush battery current and limit the stress voltage on the power switching devices. A pseudo-buck mode, preferably entered into after the linear mode has pre-charged the output capacitor, operates the boost type switching power supply in a manner providing power to the output essentially as a buck type switching power supply would. This results in continuous charging of the output capacitor, thereby reducing startup time and increasing power efficiency.

FIG. 1 shows schematically a boost voltage converter 10 comprising a switching circuit depicted generally as 11 having an input 12 and an output 13. The switching circuit 11 includes an inductor 14 coupled between the input 12 and the output 13 via a Schottky diode 15. A MOSFET 16 has its drain coupled to the junction between the inductor 14 and the Schottky diode 15, and its source connected to GND. The gate of the MOSFET 16 is controlled by a controller 17 (constituting a voltage controller) that is also coupled to the output 13 so as to be responsive to the output voltage. An output filtering capacitor 18 is connected between the output 13 and GND. The controller 17 continuously monitors the voltage at the output 13, comparing it to an internal or external reference voltage source (not shown) and sending a corresponding control signal to the MOSFET 16, which serves as a switching element.

In FIG. 2 there is shown schematically a buck voltage converter 20, which uses similar components to the boost converter 10 shown in FIG. 1 and will therefore be described briefly using identical reference numerals. Thus, the buck converter 20 comprises a switching circuit depicted generally as 11 having an input 12 and an output 13. The switching circuit 11 includes an inductor 14 coupled between the input 12 and the output 13 via a MOSFET 16 whose drain is coupled to the inductor 14 and whose source is connected to the input 12. A Schottky diode 15 is connected with its cathode between the junction between the MOSSES 16 and the inductor 14 and its anode to GND. The gate of the MOSFET 16 is controlled by a controller 17 that is also coupled to the output 13 so as to be responsive to the output voltage. An output filtering capacitor 18 is connected between the output 13 and GND. The controller 17 continuously monitors the voltage at the output 13, comparing it to an internal or external reference voltage source (not shown) and sending a corresponding control signal to the MOSFET 16 which serves as a switching element.

In both cases, when the MOSFET 16 is conducting, current flows via the MOSFET 16 through the inductor 14, thereby accumulating in the inductor energy that is discharged when the MOSFET 16 is cutoff and charges the capacitor 18 via the Schottky diode 15. Such a method is based on so-called feedback correction and does not allow for a utilization of the existing in-system knowledge about an upcoming cycle pulse load change. The very nature of such a method is based on the presence of constant error of the output voltage, in order to allow the voltage controller to realize that such an error exists and try to correct it. Moreover, such an approach is very sensitive to the timing parameters of the regulated circuit and frequently causes some oscillations due to over- or under-regulation of the output voltage, due to method of regulation, after every sharp change of the load current.

The need for two types of voltage converters is derived from a need to increase the input voltage to a higher level (Boost converter) or to decrease the input voltage to a lower level (Buck converter).

FIG. 3 shows functionally a conventional pulse load system 30 such as TDD (Time Domain Duplexing), TDMA (Time Domain Multiple Access), different Cellular (TDMA, CDMA, GSM and 3G standards), Cordless telephony (FHSS, DSS, TDD) and Telematics (remote utility metering). The system 30 utilizes either of the voltage converters 10 or 20 as a standalone, independently working circuit. The voltage converter 10, for example, supplies the power voltage to a Baseband controller 31 and an RF circuit 32.

The Baseband controller 31 is a standard component in such systems and supervises the digital data processing required for radio transmission. This includes speech coding, encryption, packetization, error detection and correction for both the packet header and the payload data streams, sometimes signal spreading and de-spreading and/or frequency hopping. Thus, among the various tasks performed by the Baseband controller, is the control of the cycle phase of the RF circuit 32 (like Receive, Idle, Tune or Transmit).

FIG. 4 shows graphically typical power consumption during the transmit-receive cycle of TDMA system. Thus, during idle periods of the cycle there may be minimal baseline power consumption, corresponding with no need to transmit or receive any signal, typically during this time other system can transmit their signal. When it is required to transmit, the RF circuit 32 is first turned on to be tuned to the required transmission frequency and the power consumption rises, but the main transmitting power amplifier is not yet turned on at this stage. Once the RF circuit 32 is tuned, transmission may take place and during this phase of the cycle the power consumption rises to its maximum level. After transmission is complete, the cycle returns to the idle state awaiting receipt of information transmitted by a remote device operating at a frequency that is first communicated to the system during a control cycle. The RF circuit 32 is then tuned to the receiving frequency, whereupon the power consumption rises. Once the RF circuit 32 is tuned, receiver is enabled and during this phase of the cycle the power consumption rises still more. After reception is complete, the cycle returns to the idle state and the cycle repeats as necessary. All the above is just one of possible examples of communication systems with a pulse load, also known as a TDMA system. If a TDMA system is working without any idle time, it becomes a simple TDD system. There are many possible combinations when the separation of different users is done in frequency domain like GSM, or in Code domain like CDMA etc.

In such a system the load exhibits a pulse nature, whereby it increases and decreases in time owing to the time-domain sequence of different cycle phases, such as the Idle, Tune, Transmit and Receive phases shown in FIG. 4 of the drawings. Thus, the output voltage of the standalone converter 10 or 20 changes drastically owing to the pulse load changes during the transmit-receive cycle. The controller 17 in the converter 10 or 20 continuously monitors the sharply varying output voltage, and tries to compensate for it. Since the voltage converter 10 or 20 and the Baseband controller 31 work independently of each other, they "compete" with one another so that the Baseband controller 31 causes the load seen by the voltage converter 10 or 20 to change, and the voltage converter 10 or 20 tries continuously to compensate for such change.

SUMMARY OF THE INVENTION

It is an object of the invention to provide a better method of controlling the power in a pulse load system, where competition between the voltage controller and the Baseband controller is reduced or eliminated.

This object is realized in accordance with the invention by a method for regulating a voltage converter for supplying power to a pulsed load having a known upcoming magnitude, said voltage converter including a switching circuit receiving a switching signal with a duty cycle that is adjusted by a voltage controller, said method comprising forward-correcting the duty cycle of the switching signal in accordance with the upcoming magnitude of the pulsed load.

The invention further provides an apparatus for regulating a switching circuit of a voltage converter for supplying power to a pulsed load having a known upcoming magnitude, said voltage converter including a switching circuit receiving a switching signal with a duty cycle that is adjusted by a voltage controller, wherein the voltage controller is responsive to a known upcoming cycle phase of the pulsed load and a corresponding magnitude of the pulsed load for forward-correcting the duty cycle of the switching signal.

Preferably, the controller further includes a memory for storing a time history of at least one previous cycle of the pulsed load for determining a deviation from a nominal value and applying feedback correction. Such deviation may be caused by natural aging of circuit components, varying ambient conditions and imprecise knowledge of the load value of the upcoming cycle phase of the pulsed load.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
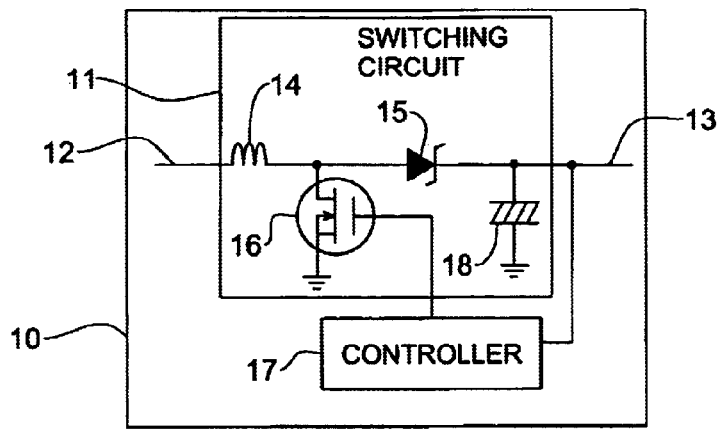
FIGS. 1 and 2 are schematic circuit diagrams of a prior art boost and buck voltage converter.
Figure 2:
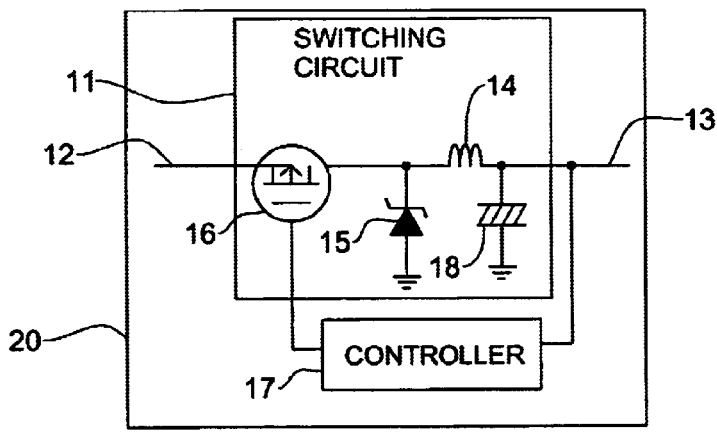
Figure 3:
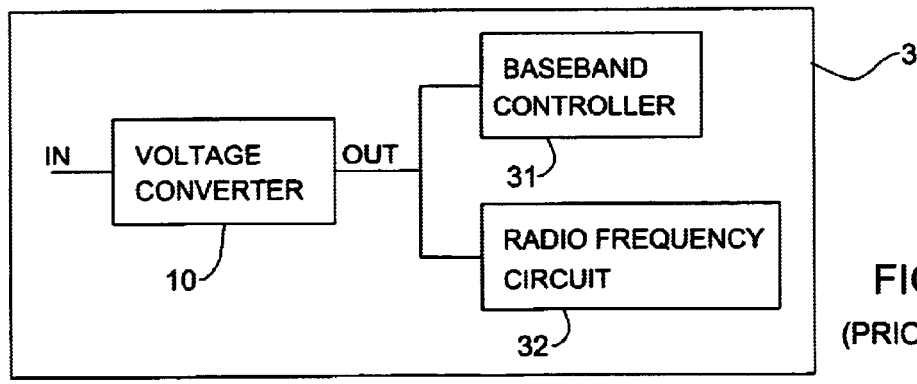
FIG. 3 is a block diagram showing functionally a prior art pulse load system based on the boost or buck voltage converter shown in FIGS. 1 and 2.
Figure 4:
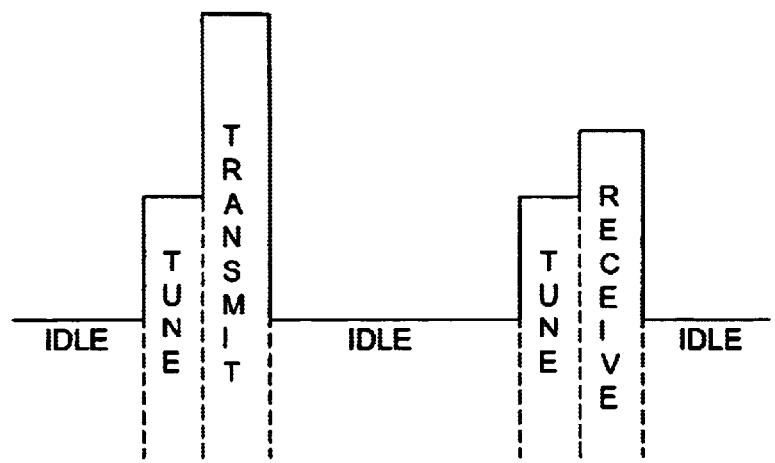
FIG. 4 shows graphically typical power consumption during the transmit-receive cycle of a pulse load system.
Figure 5:
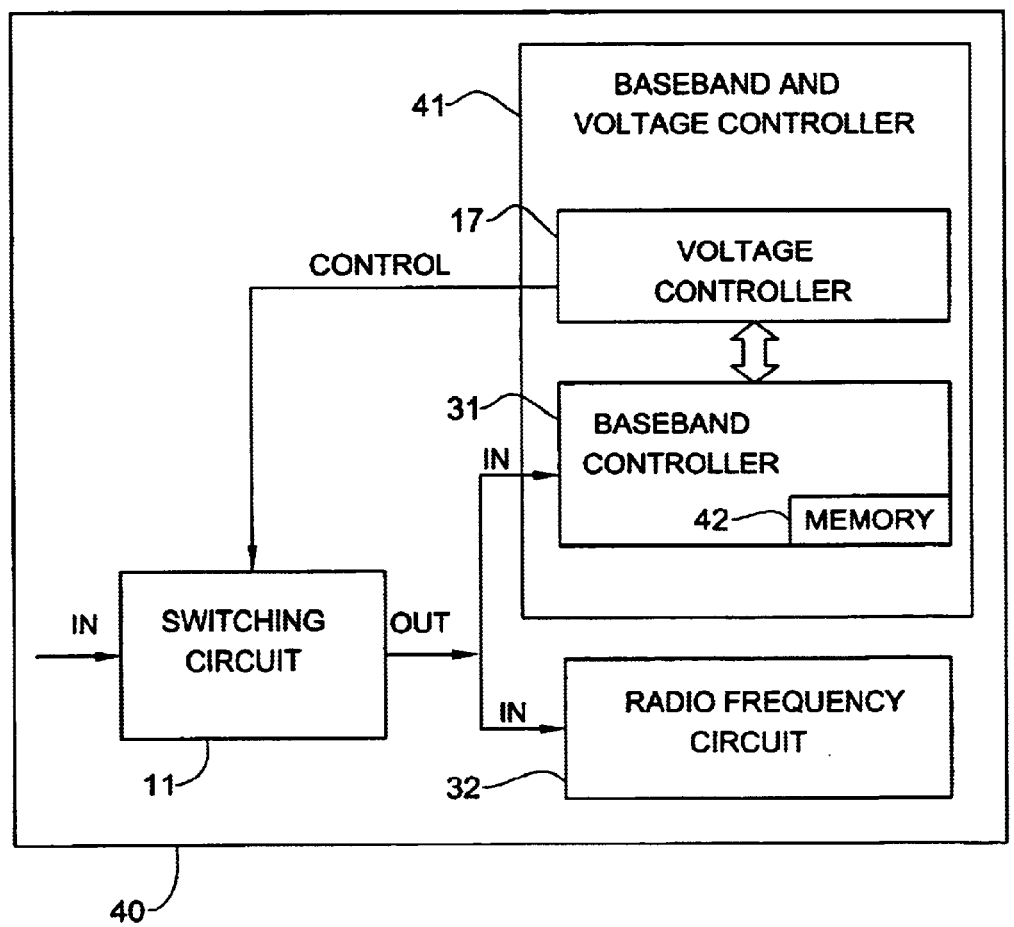
FIG. 5 is a block diagram showing functionally a pulse load system according to the invention having a combined Baseband controller and voltage controller.

FIG. 5 is a block diagram showing functionally a pulse load system 40 according to the invention. Identical reference numerals will be used to refer to similar components that appear in the system 40 and the prior art system 30 shown in FIG. 3 of the drawings. Thus, in the system 40 instead of connecting a standalone voltage controller to the Baseband controller 31 so as to monitor and compensate for changes in the load induced thereby, the voltage controller is combined with the Baseband controller to form a combined Baseband and voltage controller 41, which operates in conjunction with an RF circuit 32 as described previously with reference to FIGS. 3 and 4 of the drawings. Connected to the combined Baseband and voltage controller 41 is a switching circuit 11 of the kind employed in the boost or buck converter 10 and 20 and described in detail above with reference to FIGS. 1 and 2 of the drawings. The switching circuit 11 thus continues to operate as explained above to accumulate and discharge energy to the combined Baseband and voltage controller 41. However, in such a configuration the voltage controller in the voltage converter no longer "competes" with the Baseband controller since it now is directly controlled by the Baseband controller rather than by its output voltage comparison circuit as is done in the system shown in FIG. 3.

The system 40 exploits the fact that the Baseband controller 31 defines in which part of the cycle the system is at any particular moment. In other words, an intrinsic "knowledge" of the exact timing of the upcoming pulse load value is an essential characteristic of the combined Baseband controller and voltage controller 41. Thus the combined Baseband and voltage controller 41 sends to the switching circuit 11 the control signal exactly corresponding with the current phase of the cycle. Integrating the voltage control function inside the Baseband controller logically ties the voltage control function to the cycle phase change control function. This allows implementing so-called forward-correction of the expected voltage change due to the upcoming cycle phase change. Such an approach provides much better load regulation (changes of the output voltage due to the change of the load current), and since the voltages changes across the output filter capacitor 18 (shown in FIGS. 1 and 2) are much smaller, its size may be significantly reduced, thereby saving cost and space, which is always at a premium in systems of the kind described.

By way of example, assume that it is known from the system design that the control signal (which is typically an on/off pulse having a known duty cycle) required for the Transmit phase is "Tx", for the Receive phase is "Rx", for the Tune phase is "Tu" and for the Idle phase is "Id". Then, all that the Baseband controller needs to do, is to change the duty cycle of the control signal sent to the switching circuit 11 of the voltage converter at the precise time, or as close as possible thereto, as the moment when it changes the phases of the cycle. The various duty cycle parameters are stored in a memory 42 of the Baseband controller.

Figure 6:
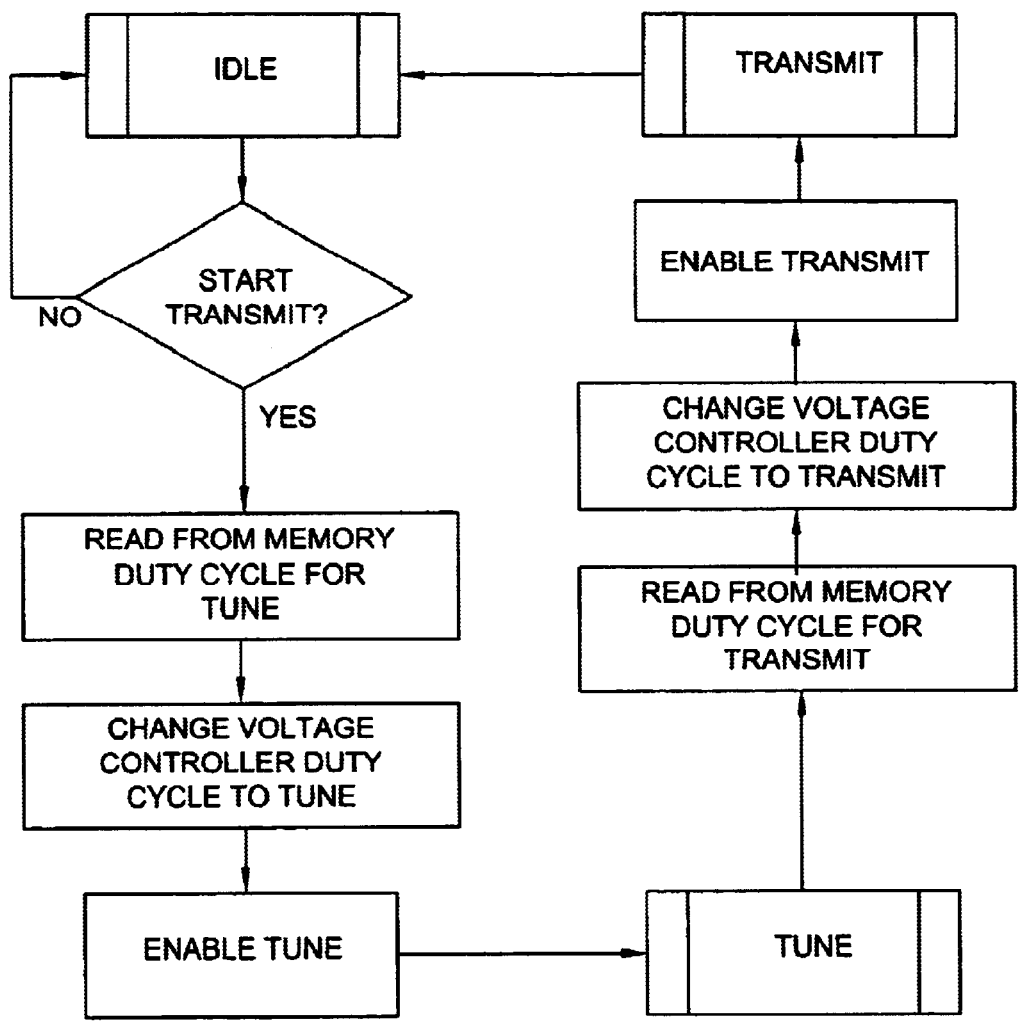
FIG. 6 is a flow diagram showing the principal operations carried out by the combined Baseband controller and voltage controller for controlling the voltage controller's duty cycle during transmission of the system of FIG. 5.

FIG. 6 is a flow diagram showing the principal operations carried out by the combined Baseband controller and voltage controller 41 for controlling the voltage controller's duty cycle during transmission of data. Thus, the Baseband controller 31 monitors the transmission cycle, remaining in "idle" mode until the time arrives to start transmitting data. The Baseband controller then reads from the memory 42 the duty cycle parameter "Tu" of the "tune" phase of the RF circuit 32, changes the duty cycle of the voltage controller to "tune" and enables "tune" mode. Upon completion of the "tune" phase, the Baseband controller reads from the memory 42 the duty cycle characteristic "Tx" of the "transmit" phase of the RF circuit 32, changes the duty cycle of the voltage controller to "transmit" and enables "transmit" mode. Analogous operations are performed when the system 40 is receiving data, the Baseband controller in this case reading from memory the duty cycle characteristic "Tu" of the "tune" phase of the RF circuit 32, and changing the duty cycle of the voltage controller to "tune". Thereafter, it reads from memory the duty cycle characteristic "Rx" of the "receive" phase of the RF circuit 32, changes the duty cycle of the voltage controller to "receive" and enables "receive" mode.

In either case, the duty-cycle of the voltage controller is automatically adjusted in advance by the Baseband controller based on built-in, intrinsic "knowledge" about the load current consumption during different cycle phases (FIG. 4), or at least approximate knowledge thereof with possible further compensation as described below with reference to FIG. 7 of the drawings.

Thus, just before the Baseband controller is about to change each phase of a transmit or receive cycle, it provides the indication that such a change is about to occur to the voltage controller. Such indication can be implemented by the same software program running on the Baseband controller which is controlling the cycle phases. The voltage controller responds to the impending change to control the duty cycle of the switching circuit 11 shown in FIGS. 1 and 2, resulting in precise adjustment of the output current capability of the switching circuit to the new upcoming conditions, resulting in little or no change in the voltage on the output filter capacitor 18 (shown in FIGS. 1 and 2). It has been found that compared with prior art circuits, the voltage drop across the filter capacitor 18 is smaller at least by an order of magnitude (10 times) than the corresponding voltage drop across the filter capacitor in prior art circuits due to forward-looking correction of the duty cycle, which, in the ideal case, should eliminate any voltage drop at all. This "side effect" of the invention provides for very significant reduction of the filter capacitance (18 in FIGS. 1 and 2) value and, correspondingly, size and cost, comprising another benefit of the invention.

There may be cases where "foreknowledge" about the magnitude of the load during different cycle phases is approximate, or where the load varies in time owing, for example, to slow changes of the system parameters, such as input voltage (e.g. battery voltage), small load current changes during the cycle phases (shown in FIG. 4) or aging of the components of the switching circuit 11 or Baseband controller 31, or owing to fluctuations of temperature or any other environmental conditions etc. Such changes contemplate so-called "slow" changes which occur over many cycles of communication as well as "fast" changes which occur during successive phases of a single communication cycle.

Figure 7:
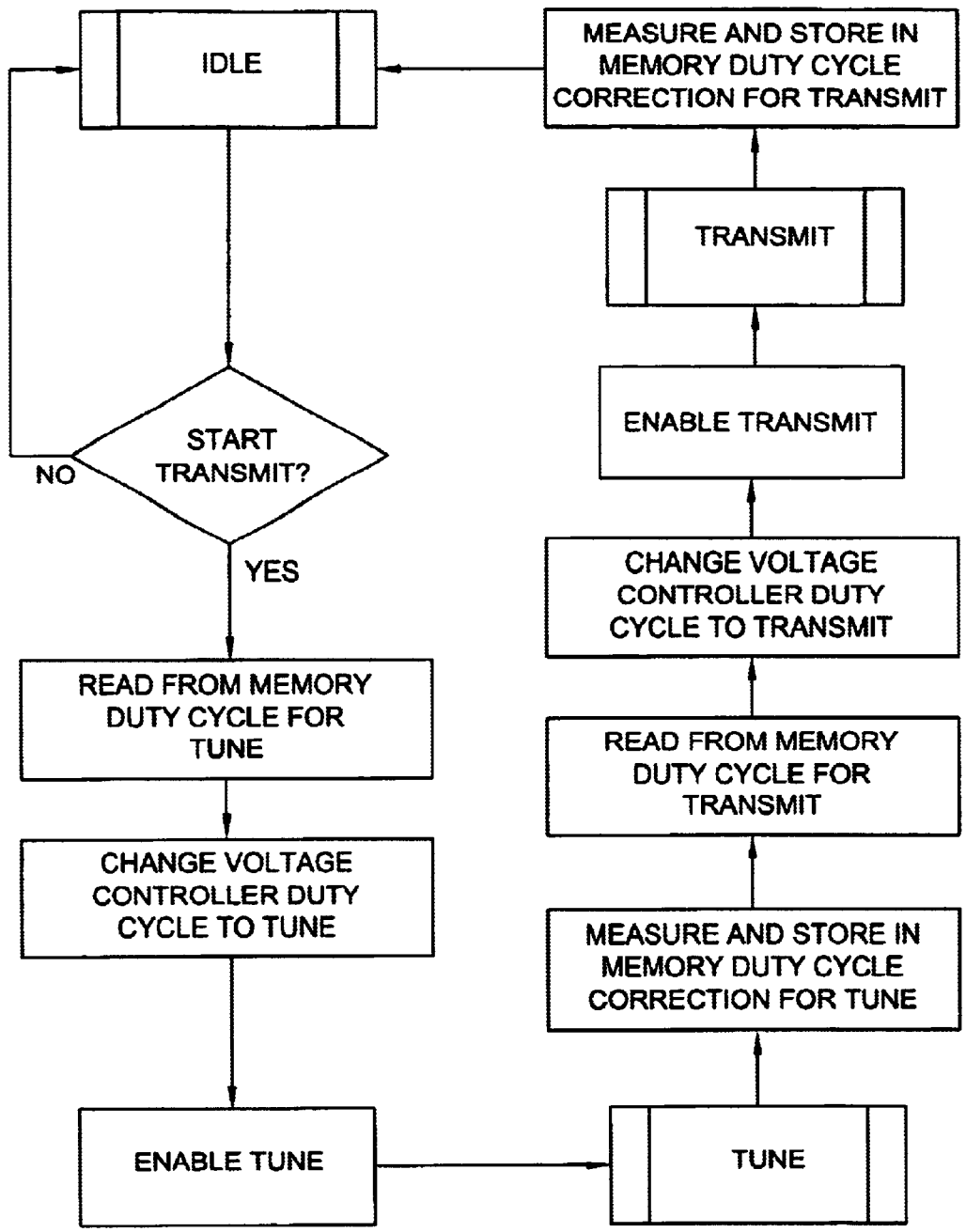
FIG. 7 is a flow diagram showing the principal operations carried out by the Baseband controller for compensating for variations in load consumption.

FIG. 7 is a flow diagram showing the principal operations carried out by the Baseband controller in accordance with a further aspect of the invention for compensating for such variations in load consumption or for imprecise foreknowledge thereof. The Baseband controller combined with the voltage controller monitors the output voltage on the output terminal of the switching circuit 11, shown as "OUT" in FIGS. 3 and 5, and adjusts it using conventional feedback correction. The results of the monitoring (measurement) of the output voltage of the voltage controller during the previous cycle phase(s) of the same type are stored and accumulated in the memory 42 of the Baseband controller in order to predict the value of compensation required for the next cycle phases of the same type, i.e. characterized by basically the same load voltage value.

An example is shown in the following table for various phases of a transmit cycle where measured voltages are shown in millivolts:

TABLE I

| | Accumulated load voltage history | | | | | |
|---|---|---|---|---|---|---|
| Cycle | Tune | Error | Correction | Transmit | Error | Correction |
| 1 | 3.00 | 0.00 | 0.00 | 6.00 | 0.00 | 0.00 |
| 2 | 3.00 | 0.00 | 0.00 | 6.00 | 0.00 | 0.00 |
| 3 | 2.95 | −0.05 | 0.00 | 5.90 | −0.10 | 0.00 |
| 4 | 3.01 | +0.01 | +0.05 | 6.03 | +0.03 | +0.10 |
| 5 | 2.98 | −0.02 | −0.01 | 5.99 | −0.01 | −0.03 |
| 6 | 3.01 | +0.01 | +0.02 | 5.995 | +0.005 | +0.01 |

Thus, it is shown that for two cycles the target load voltage values for Tune and Transmit phases are 3 and 6 V, respectively. After the second cycle the measured load voltage falls by 0.05 V during the tune phase and by 0.10 V during the transmit phase of the cycle. However, since it is known that the correct Tune and Transmit load voltage values are 3 and 6 V prior to the measured fluctuations, the corresponding errors may be determined as tabulated and suitable feedback compensation applied in the next cycle, and so on, and so forth. Thus, on determining that the error in the "tune" phase of the third cycle is −0.05 V a feedback correction of +0.05 V is applied in the next cycle (as shown in the Table). It is seen that this slightly overcompensates for the error, and the voltage now becomes 3.01 V, i.e. an error of +0.01 V. This process of measuring the error and applying feedback compensation continues during subsequent cycles during both the "tune" and "transmit" phases. Similar feedback compensation is also applied during the "tune" and "receive" phases of each cycle.

It will be appreciated that the measured voltages or the errors as calculated from a predetermined steady-state are representative of the load voltage and may be stored in the memory 42 so as to calculate the required error and feedback compensation to apply during each cycle. Likewise, it will be understood that feedback compensation based on simple measurement of the error during the previous cycle is merely exemplary. More sophisticated compensation algorithms may also be used employing extrapolation, regression, Lineal Predictive Coding (LPC), Look-Up Table etc. for correction calculation.

What is claimed is:

1. Method for regulating a voltage converter for supplying power to a pulsed load having a known upcoming magnitude, said voltage converter including a switching circuit receiving a switching signal with a duty cycle that is adjusted by a voltage controller, said method comprising forward-correcting the duty cycle of the switching signal in accordance with the known upcoming magnitude of the pulsed load.

2. The method according to claim 1, wherein the pulsed load is a Time Domain Duplexing (TDD), Time Division Multiple Access (TDMA), Cellular, Cordless Telephony or Telematics system.

3. The method according to claim 2, further including:
monitoring an output voltage of the voltage controller during successive cycles,
storing respective values representative of the output voltage during is different phases of each successive cycle, and
using said stored values relating to each phase of the cycle to derive a value of compensation required for the respective phase of a subsequent cycle.

4. Apparatus for regulating a switching circuit of a voltage converter for supplying power to a pulsed load having a known upcoming magnitude, said voltage converter including a switching circuit receiving a switching signal with a duty cycle that is adjusted by a voltage controller, wherein the voltage controller is responsive to a known upcoming cycle phase and a corresponding magnitude of the pulsed load for forward-correcting the duty cycle of the switching signal.

5. The apparatus according to claim 4, wherein the pulsed load is a Time Domain Duplexing (TDD), Time Division Multiple Access (TDMA), Cellular, Cordless Telephony or Telematics system.

6. The apparatus according to claim 4, wherein the controller is a combined Baseband controller and voltage controller, and the Baseband controller is configured to transfer information relating to an upcoming duty cycle of the pulsed load to the switching circuit for switching the voltage controller.

7. The apparatus according to claim 6, wherein components of the Baseband controller and voltage converter are integrated on a common integrated circuit.

8. The apparatus according to claim 4, wherein the controller applies feedback correction to compensate for changes in ambient conditions or in time-related properties of the pulsed load, or in input voltage due to the battery discharge, or due to other slow changes.

9. The apparatus according to claim 8, wherein the controller includes a memory for storing a time history of at least one parameter of the pulsed load for determining a deviation from a nominal value and applying feedback correction.

10. The apparatus according to claim 9, wherein the controller is configured to:
monitor an output voltage of the voltage converter during successive cycles,
store respective values representative of the output voltage during different phases of each successive cycle, and
use said stored values relating to each phase of the cycle to predict a value of compensation required for the respective phase of a subsequent cycle.

11. The apparatus according to claim 4, wherein the voltage converter is a boost converter.

12. The apparatus according to claim 4, wherein the voltage converter is a buck converter.

13. The apparatus according to claim 4, wherein the voltage converter includes an output filter capacitor having a capacitance that is an order of magnitude smaller than a corresponding output filter capacitor in a feedback voltage controller.

* * * * *